United States Patent [19]

Tompkins et al.

[11] 3,858,212

[45] Dec. 31, 1974

[54] MULTI-PURPOSE INFORMATION GATHERING AND DISTRIBUTION SYSTEM

[76] Inventors: Leo L. Tompkins, 127 Wacaster St., Jackson, Miss. 39210; J. Willis Hughes, 306 Glenway Dr., Jackson, Miss. 39216

[22] Filed: Aug. 29, 1972

[21] Appl. No.: 284,516

[52] U.S. Cl............... 343/100 CS, 325/55, 343/208

[51] Int. Cl............................................... G01s 1/02

[58] Field of Search....... 343/100 AD, 100 CS, 208; 325/55

[56] References Cited

UNITED STATES PATENTS 2,171,218 8/1939 Kriebel.......................... 343/100 CS 2,465,976 3/1949 Goldsmith........................... 343/208

*Primary Examiner*—Maynard R. Wilbur

*Assistant Examiner*—Richard E. Berger

*Attorney, Agent, or Firm*—Sughrue, Rothwell, Mion, Zinn & Macpeak

[57] ABSTRACT

A multi-purpose information gathering and distribution system in which a plurality of remote stations are controlled by and report to a central station. The central station includes an omni-directional antenna which radiates a modulated information signal to all of the remote stations. At predetermined intervals the information signal is interrupted and a query signal is transmitted to individual remote stations by means of a directional antenna directed to the particular remote station. Sensors located at the remote stations sense various conditions and upon receipt of a query signal transmit a signal to the central station which identifies the remote station and indicates the condition of the sensors at the remote station.

16 Claims, 5 Drawing Figures

MULTI-PURPOSE INFORMATION GATHERING AND DISTRIBUTION SYSTEM

BACKGROUND OF THE INVENTION

1. Field of the Invention

This invention relates to a multi-purpose information gathering and distribution system for transmitting information to a plurality of remote stations and gathering data acquired at the remote stations and more paticularly to a system for transmitting general information such as music to a plurality of remote stations and for intermittently querying the remote stations and receiving data related to conditions at each remote station when the remote station is queried.

2. Description of the Prior Art

Several prior art systems exist for communication between a central station and a plurality of remote stations. In one type of prior art system the central station radiates a coded signal by means of an omni-directional antenna to all of the remote stations. The coded signal contains the address of a particular remote station and upon receiving the coded signal the remote station transmits back to the central station a signal indicative of conditions at the remote station. In this type of system, the central station must have a means for generating a large number of different coded signals corresponding to the addresses of the remote stations. If an error occurs in the transmission of the coded signal from the central station of if an error is introduced in the coded signal due to noise received by the remote station it is very likely that the wrong station will transmit data back to the central station. The central station will have no way of determining that the data has been received from a remote station other than the one which it intended to query and therefore data with erroneous locations will be recorded at the central station.

In another type of prior art system, communications between a central station and a plurality of remote stations is accomplished by the use of a directional antenna system. The central system radiates a query signal to one of the remote stations by means of a directional antenna and, upon receipt of this signal, the remote station transmits data back to the central station. This type of system overcomes some of the problems found in a prior art using an omni-directional antenna for querying the remote stations. However, this type of system has the disadvantage that the central station is only capable of communicating with one remote station at a time. If it is desired to transmit information to all of the remote stations, then the data must be transmitted individually to each remote station. This, of course, would require a large amount of time to disseminate information to a large number of remote stations. Further, in systems of this type it is impossible to transmit a continuous type of information such as music to the remote stations.

In still other prior art systems, an omni-directional antenna at a central station is used to establish a communication channel between the central station and one remote station. Once the channel has been established, a directional antenna at the central station is then used to communicate with the remote station. This type of prior art system is the same as that described above, which uses directional antennas in the communication link, with the exception that the omnidirectional antenna is used to facilitate the establishment of the communication link when the remote station is mobile.

SUMMARY OF THE INVENTION

It is an object of this invention to provide a communication system between a central station and a plurality of remote stations in which a continuous type of information is transmitted, by the central station, simultaneously to all of the remote stations and each remote station is sequentially queried by the central station and transmits upon receipt of a query signal data indicative of the conditions at the remote station to the central station.

It is another object of this invention to provide a communication system between a central station and a plurality of remote stations in which a continuous type of information is transmitted from the central station to all of the remote stations by radiating the information from an omni-directional antenna located at the central station.

It is still another object of this invention to provide a communication system in which a directional antenna at the central station is used to sequentially query all of the remote stations.

It is still another object of this invention to provide a communication system in which a queried remote station transmits, to the central station, data indicative o conditions at the remote station.

The system of this invention is used to establish communication links between a central station and a plurality of remote stations for gathering and disseminating various types of information. The required equipment may be shared between several needed services in order to provide an economical system which would not be possible when used for only a single service. The central station includes a transmitter section comprising a continuous or steady information signal transmitter with an omni-directional antenna and a query signal transmitter with a directional antenna. The steady information signal transmitter transmits information such as music or instructions to all of the remote stations simultaneously. The information signal may be a modulated pulse signal. The query signal transmitter transmits pulses to each individual remote station when the directional antenna coupled to the query signal transmitter is directed to the station. The query pulse is transmitted during a very short interruption in the steady information signal. This interruption is so small as to be unnoticed at the remote station.

Each remote station has a plurality of sensors for sensing various conditions at the remote stations. These sensors may, for instance, include fire, burglary, power failure and utility meter sensors. Whenever a condition is sensed at a remote station, it is stored in a storage means such as a shift register with an identification code indicative of the particular remote station.

Each remote station also includes a receiver for receiving the steady information signals and query signals from the central station. The steady information signal is detected and then utilized in a manner consistent with the type of information that it is. In other words, if the steady information signal is music it may be broadcast over a speaker system to the area of the remote station. If on the other hand, the information signal is an instruction it may be relayed to an operator at the remote station. The query signal is detected and applied to an enabling means which is used to shift the stored data indicative of the sensed conditions and the station identification code from the storage device. The stored data is applied to a reporting transmitter which then transmits this data back to the central station. It can be seen that the remote station stores data and does not transmit it until it is queried. Furthermore, if no data is stored, then upon the receipt of a query pulse no signal will be transmitted. This of course is indicative of the fact that the sensors at the remote station have not sensed any conditions which require notification of the central station.

The central station includes a receiving system which receives the data transmitted by the remote stations. The remote signal is detected and decoded to provide an indication of which remote station transmitted the data and the nature of the data. The decoded information is then applied to some type of read out system such as a visual read out, an alarm or an interface to a storage or data retrieval facility.

DESCRIPTION OF THE PREFERRED EMBODIMENT

The system includes one central station and a plurality of remote stations which are positioned in various directions at various distances from the central station. The remote station may all be identical or may be configured differently depending upon their function. Some remote stations may have particular sensors for sensing various conditions while others may have different sensors for different conditions. The remote stations are queried at least once during eacy cycle of a directional antenna at the central station.

Figure 1:
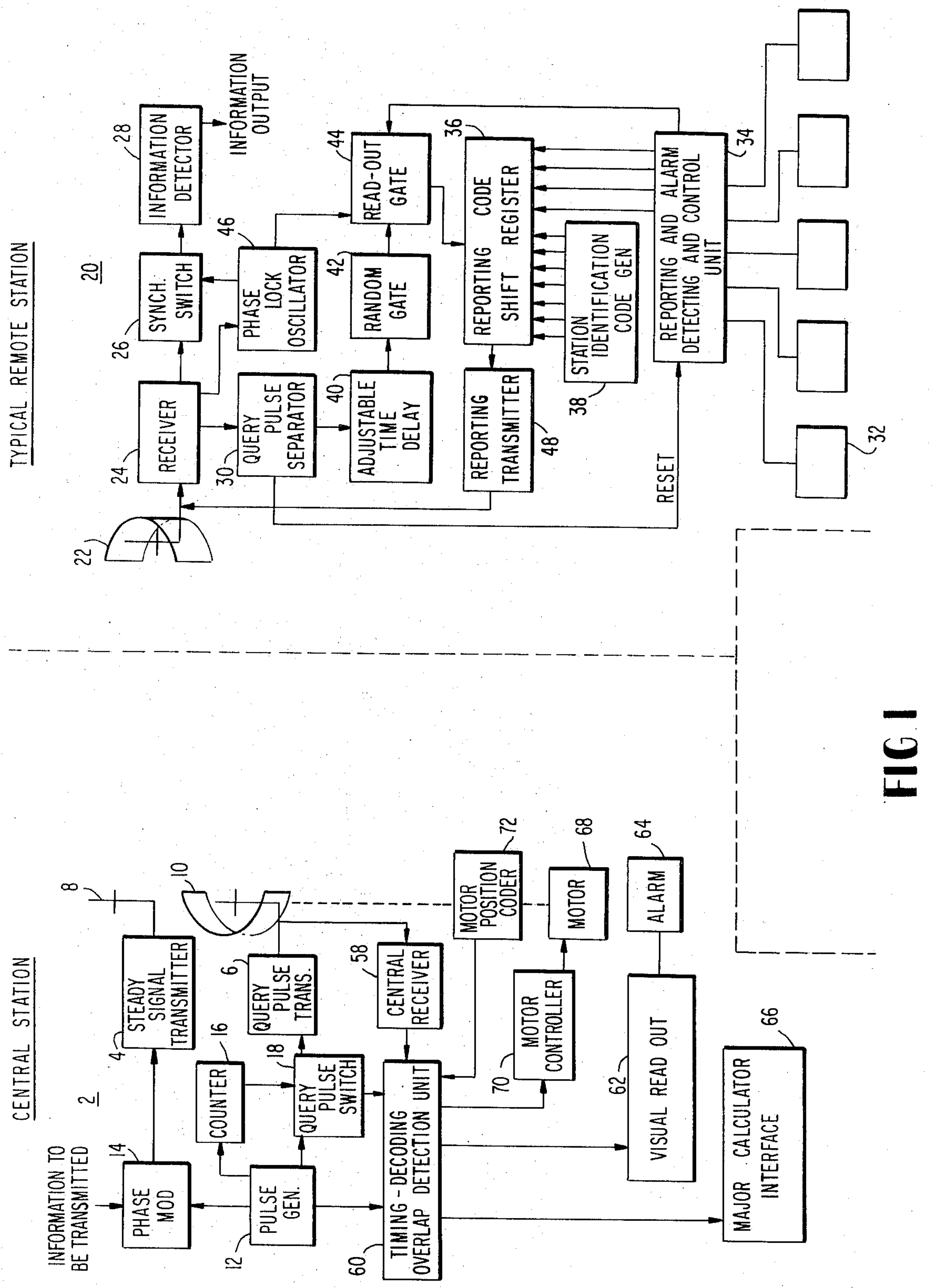
FIG. 1 is a block diagram of a system in accordance with the present invention.

Referring to FIG. 1, central station 2 includes steady signal transmitter 4 and query pulse transmitter 6. The signal produced by steady signal transmitter 4 is radiated from omni-directional antenna 8 while the query signal is radiated from directional antenna 10.

Pulse generator 12 is used to modulate the carrier of the steady information signal and the query pulse signal. The pulses from pulse generator 12 are phase modulated in phase modulator 14 with steady information such as music or instructions which are to be transmitted to all of the remote stations. This phase modulated signal is transmitted by steady signal transmitter 4 and omni-directional antenna 8 to all of the remote stations which surround the central station. The output of pulse generator 12 is also applied to counter 16 and query pulse switch 18. The counter 16 reaches its full count and produces an output after a predetermined number of pulses have been generated by pulse generator 12. When the counter produces an output it turns on query pulse switch 18 which applies a pulse output to query pulse transmitter 6. In this manner, the query pulse switch may be turned on, for example for two pulses in every 2,000 pulses generated by pulse generator 12. The pulses from query pulse transmitter 6 are positioned such that they fall between the phase modulated pulses transmitted by the steady information signal transmitter 4.

The steady information signal radiated by omnidirectional antenna 8 is received by all of the remote stations. A typical remote station 20 is shown in FIG. 1. The information signal is received by directional antenna 22 which is directed towards the central station. The signal is received by receiver 24 and applied through synchronous switch 26 to an information detector 28. The output of information detector 28 is the informtion transmitted by steady signal transmitter 4 which may be, for instance, music or instructions to the remote stations. If the information is music, it may be applied to a speaker system at the remote stations.

Receiver 24 also receives query pulses radiated by directional antenna 10 when the directional antenna is directed at the particular remote station. The amplitude of the query pulses is significantly greater than that of the phase modulated pulses of the steady information signal. Query pulse separator 30 detects the larger amplitude signals.

Prior to the detection of query pulses, the remote station has accumulated data by using various sensors 32. These sensors may include fire, intrusion, meter reading, etc. The information gathered by the sensors is applied to reporting and alarm detection control unit 34. If a condition is sensed by one of the sensors 32, unit 34 produces an output which is stored in reporting shift register 36.

Station identification code generator 38 produces an identification code which is indicative of the particular remote station. This code is also stored in reporting shift register 36.

When a query pulse signal is detected by query pulse separator 30 it is applied to adjustable time delay 40, delayed for a predetermined amount of time and then applied to random gate 42. This random gate passes the first query pulse in each sweep of the beam but, thereafter, passes on the average about one pulse in ten of those applied to it; and these are subject to the random nature of the gate. The output of this gate is applied to read out gate 44. The output of receiver 24 is also applied to a phase locked oscillator 46 which produces a series of clock pulses which are in phase with the signal received by receiver 24. Therefore, the clock output is in phase with respect to the query pulses received by receiver 24. The clock signal from phase locked oscillator 46 is also applied to read out gate 44. Reporting and alarm detecting and control unit 34 also produces an output when one of the sensors 32 detects a condition. An output of the detecting and control unit is applied to read out gate 44. When the read out gate 44 receives an output from random gate 42 and reporting and alarm detecting and control unit 34, it gates the clock pulses from phase locked oscillator 46 into reporting shift register 36. The clock pulses then shift out the information stored in the shift register. As the information is shifted out of the shift register it is applied to reporting transmitter 48 which transmits the stored information to the central station 2. The information transmitted to the central station includes the station identification code which identifies the remote station transmitting the information and a signal indicative of the condition of the sensors at the remote station.

The system is designed so that the remote station does not transmit in response to a query signal unless the sensors 32 have sensed a condition warranting a report. If reporting and alarm detecting and control unit 34 has not received a signal from one of the sensors 32, then it does not apply a signal to read out gate 44. Thus, the read out gate is not opened and clock pulses are not applied to reporting shift register 30 to shift the data out.

The lack of signal from query pulse separator 30 causes reporting and alarm detecting and control unit 34 to reset. This occurs when the beam from directional antenna 10 at the central station is no longer directed to a particular remote station. Thus, after being queried a remote station is reset so that it can report present conditions during the next cycle when it is queried.

As can be seen, the remote station 20 is constantly receiving a steady information signal from the central station. This information signal may, of course, be used for a multitude of purposes. Typically, the signal may be used to provide music at the remote stations or to send instructions to an operator at a remote station. The directional antenna 10 at the central station rotates in a manner such that its radiation pattern scans each remote station at least once during each rotation. When the directional antenna scans a particular remote station, that station receives a query pulse signal from the central station. In response to that query pulse signal, the remote station transmits back to the central station the condition of its sensors and its station identification code. In this manner the central station interrogates each remote station at least once during each revolution of its directional antenna, thus gathering data from all of the remote stations while simultaneously transmitting a steady information signal to all of the remote stations.

Random gate 42, in the remote station, is used to prevent two closely positioned field stations from simultaneously transmitting information to the central station and thus causing interference and confusion at the central station. The random gate 42 may have, for example, 10 intervals and randomly passes the output of adjustable time delay 40 in one of these intervals. If two remote stations located in close proximity to each other simultaneously receive the query pulse signals, it is highly improbable that their respective read out gates 44 will be gated on at the same time because of the operation of random gate 42. Random gate 42, will in all probability, pass the output of the adjustable time delay in each of the remote stations during a different interval and thus the read out gate 44 will be gated on during a different interval for each remote station. In this manner, the reporting transmitter of the two remote stations will transmit their information signals back to the central station at different times.

Figures 2, 3, 4, 5:
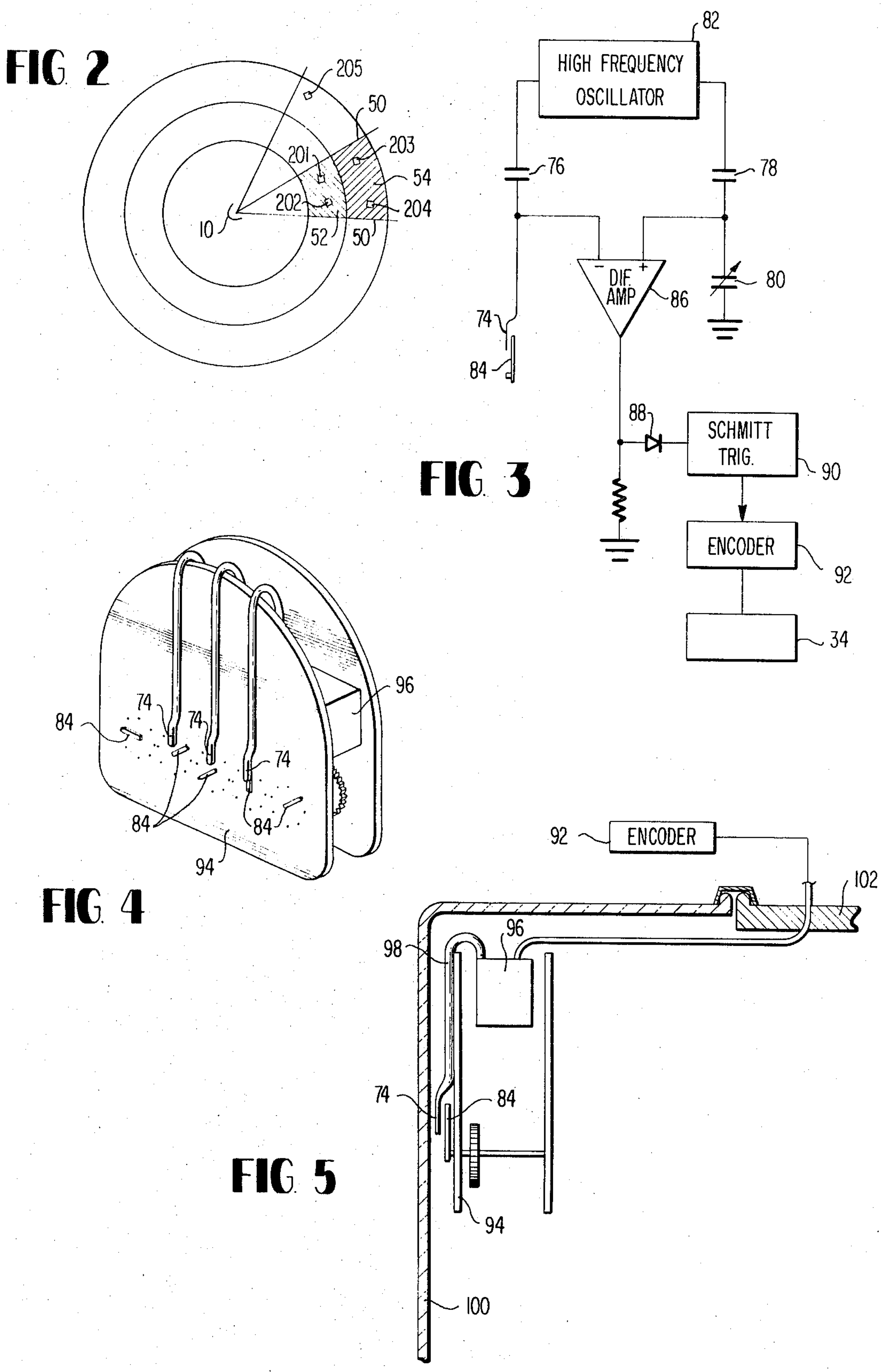
FIG. 2 is a chart showing the manner in which remote stations may be grouped in sectors in order to reduce the number of identification codes required.
FIG. 3 illustrates a device for reading a meter in accordance with the present invention.
FIG. 4 shows a perspective view of the face of a meter with the device of FIG. 3 installed and the sensors over the zero position of the hands.
FIG. 5 is a vertical section through one of the indicator shafts with the hand at zero and the sensors in place.

Adjustable time delay 40 is included in order to reduce the number of station identification codes necessary to identify each remote station. Referring to FIG. 2, directional antenna 10 of central station 2 has a radiation pattern forming the sector of a circle and defined by lines 50. Four remote stations 201, 202, 203 and 204 are located within the radiation pattern of antenna 10. The four stations may be thought of as being divided into two groups, each group falling within a band of the circle formed by the rotation of the radiation pattern of antenna 10. The first group, consisting of stations 201 and 202, is located in an area 52 while the second group, consisting of stations 203 and 204, is located within an area 54. It can be seen that the time required to transmit a signal to the remote station and to receive a signal back at the central station would be different for each of the remote stations. However, the distance between the remote stations is so small that the time difference is not easily detectable at the central station. Adjustable time delay 40 is used to exaggerate the time difference between the stations located in one group with respect to the stations located in another group. This is done by introducing a significant lag in the adjustable time delays of one group with respect to the other group. In other words, adjustable time delay 40 is adjusted to one time delay for all of the remote stations located in area 52 and to an appreciable longer time delay for all the remote stations located in area 54. In this manner a different station identification code must be used for each station in area 52 and for each station in area 54. However, the same identification code may be used for a station in area 52 as in area 54. These stations can easily be distinguished at the central station 2 because of the time delay with respect to the receipt of their signals.

The information signal from reporting transmitter 48 in FIG. 1 is transmitted back to central station 2 at a frequency which is different than the frequency of the signal transmitted by central station 2. The difference in frequency prevents any reflections of the pulse signal transmitted by central station 2 from being received by the central station 2. The information signal from reporting transmitter 48 is received in receiver 58 located at the central station. This signal is applied to timing, decoder and overlap detection unit 60 which decodes the signal and produces an output which may be applied to visual read out 62, alarm 64 and/or interface 66. The interface 66 may be used to interface the system with a computer or data storage system for recording the outputs of the various sensors at the remote stations.

Antenna 10 is rotated by motor 68 which is controlled by motor control 70. The motor control controls the speed of rotation of the antenna. Motor position coder 72 applies a signal to the timing, decoding and overlap detection unit 60 which is indicative of the position of antenna 10. This information is used to determine which remote station has transmitted information to the central station. Motor controller 70 receives timing signals for controlling the speed of motor 68 from timing, decoding and overlap detection unit 60.

The operation of random gate 42 to separate signals from a plurality of remote stations located in the same antenna radiation pattern has been discussed above. However, since the operation of the gate is random, there will be times at which the time interval selected by the gates in two different stations will be the same and thus interference will occur between the signals transmitted by the corresponding reporting transmitters. When central receiver 58 is unable to distinguish between two signals from different remote stations, timing, decoding and overlap detection unit 60 provides a signal to motor controller 70 which is used to slow down the speed of motor 68. By slowing down the motor, the query pulses from query pulse transmitter 6 are again radiated to the remote stations which just transmitted their data and the chances of the random gates again gating on during the same time interval are extremely remote. Therefore, the signals transmitted by the remote stations do not interfere with each other and they are properly received by the central receiver 58. The overlap detection therefore permits the reinterrogation of the remote stations if the signals received at the central station are not clearly distinguishable.

The number of identification codes for individual remote stations may further be reduced by dividing the rotation pattern of directional antenna 10 into sectors. Referring to FIG. 2, remote station 205 can use the same identification code as remote station 203, these stations being distinguishable by the fact that motor position coder 72 will produce a different output for station 203 than for station 205.

Although the steady information signal is a phase modulated pulse signal it is readily apparent that any type of pulse modulation may be used to modulate the output of the pulse generator 12 with the steady information signal.

The system may be used for meter reading by using a first data signal to represent a predetermined metal total and then using other data signals to represent various multiples of the predetermined total. Referring to FIG. 3, a capacitive bridge circuit is formed by capacitive probe 74, fixed capacitors 76 and 78 and a variable capacitor 80. High frequency oscillator 82 is connected between capacitors 76 and 78. Variable capacitor 80 is adjusted to balance the bridge when the pointer 84 of a meter is positioned directly under the capacitive probe 74. The capacitance of probe 74 changes as pointer 84 moves past the probe, thus unbalancing the bridge. Differential amplifier 86 is connected across the bridge circuit and produces an output when the bridge becomes unbalanced. The output of the differential amplifier is applied through rectifier 88 to Schmitt trigger circuit 90. Thus, when the bridge is unbalanced, the output of the differential amplifier fires the Schmitt trigger circuit 90 causing it to change states. The output of the Schmitt trigger circuit is applied to an encoder 92, the output of which is applied to reporting and alarm detecting and control unit 34 shown in FIG. 1. Thus, every time pointer 84 passes a predetermined position such as the O position on the meter, an encoded signal is applied to the reporting and alarm detecting and control unit 34.

FIG. 4 illustrates a meter face 94 with a plurality of pointers 84. The probes 74 are positioned over the O position of the various meter dials. The electronic circuitry illustrated in FIG. 3 is housed in housing 96 behind the meter face.

FIG. 5 is a vertical section through the meter illustrated in FIG. 4. Probe 74 is positioned slightly away from the pointer 84 at the O position and is connected to the circuitry in housing 96 by means of wires 98. The meter is encased in a glass housing 100 clamped to a base 102.

While the invention has been particularly shown and associated with reference to preferred embodiments thereof, it will be understood by those skilled in the art that various changes in form and details may be made therein without departing from the spirit and scope of the invention.

What is claimed is:

1. A multipurpose communications system for communicating between a central station and a plurality of remote stations, said system comprising:
   a. first transmitter means at said central station for transmitting information to said remote stations, said transmitter means including:
      1. steady signal transmitter means for transmitting a steady information signal to all of said remote stations;
      2. omni-directional antenna means for radiating said steady information signal to all said remote stations;
      3. query signal transmitter means for transmitting query signals to said remote stations during very short predetemined interruptions in said steady information signal; and
      4. directional antenna means for radiating said query signals to at least one of said remote stations at a time;
   b. first receiver means at said central station for receiving data signals from said remote stations;
   c. second receiver means at each of said remote stations for receiving said steady information signals and said query signals from said first transmitter means;
   d. sensor means at each of said remote stations for sensing various conditions at said remote stations; and
   e. second transmitter means at each of said remote stations for transmitting to said first receiver means at said central station data signals indicative of the conditions sensed by said sensor means in response to said query signals.

2. The system as set forth in claim 1 wherein said query signal transmitter means comprises:
   a. oscillator means for generating a series of pulses;
   b. timing means, coupled to said oscillator means, for producing an enabling signal at predetermined intervals; and
   c. transmitter means for receiving said enabling signal and for transmitting said query signal upon receipt of said enabling signal.

3. The system as set forth in claim 1 wherein said directional antenna means comprises:
   a. a rotatable directional antenna;
   b. motor means for cyclically rotating said directional antenna;

and
   c. antenna motor control means for controlling the operation of said motor means such that a query signal is sent to each remote station at least once during each cycle of rotation of said directional antenna.

4. The system as set forth in claim 2 wherein said steady signal transmitter means comprises:
   a. modulated means, coupled to said oscillator means, for modulating said series of pulses with an information signal; and
   b. transmitter means, coupled to said modulator means, for transmitting said modulated series of pulses wherein said modulated series of pulses is said steady information signal and said query signals from said query signal transmitter means are transmitted between pulses of said modulated series of pulses.

5. The system as set forth in claim 4 wherein said modulator means is a phase modulator for phase modulating said series of pulses in accordance with said information signal.

6. The system as set forth in claim 1 wherein said second transmitter means comprises:

a. station identification code generator means for generating an identification code indicative of the identification of a remote station;

b. storage means coupled to said sensor means and said code generator means for storing said identification code and said signals indicative of the conditions sensed by said sensor means; and c. a reporting transmitter for transmitting the data stored in said storage means to said central station.

7. The system as set forth in claim 6 wherein said second receiver means comprises:

a. information detector means for detecting said steady information signal;

b. query detector means for detecting said query signal;

c. enabler means, coupled to said query detector means, for shifting the information stored in said storage means to said transmitter when a query signal is detected.

8. The system as set forth in claim 7 wherein said enabler means comprises:

a. random gate means for randomly gating said query signal;

b. clock means; and c. read out gate means, coupled to said storage means, for shifting the information stored in said storage means into said transmitter upon the simultaneous occurrence of outputs from said random gate means, said clock means, and said sensor means, whereby interference between the transmission of said data signals by two of said remote stations is substantially eliminated by the random operation of said enabler means due to said random gate means.

9. The system as set forth in claim 8 wherein said remote stations are positioned at various distances from said central station along radial lines extending from said central station, said remote stations being divided into groups, each group lying in a sector of a circle formed by the rotation of the radiation pattern of said directional antenna, and wherein each remote station in a group has a different identification code and wherein a remote station in another group may have the same identification code whereby each remote station may be identified at said central station by its identification code and the sector in which it is located.

10. The system as set forth in claim 8 wherein said remote stations are positioned at various distances from said central station along radial lines extending from said central stations, said remote station being divided into groups, each group lying in a band formed by the rotation of the radiation pattern of said directional antenna between two radial distances from said directional antenna, and wherein each remote station in a group has a different identification code and wherein a remote station in another group may have the same identification code whereby each remote station may be identified at said central station by its identification code and the band in which it is located.

11. The system as set forth in claim 10 wherein said enabling means further includes time delay means for delaying said query signal for a period of time corresponding to the band in which a remote station is located whereby the band in which a remote station is located can be determined by determining the time required for receipt of said data signal at said central station in response to the transmission of a query signal.

12. The system as set forth in claim 2 wherein said timing means is a counter means for counting said pulses and for producing an enabling signal when a predetermined number of pulses have been counted, said predetermined number of pulses occurring during said predetermined interval.

13. The system as set forth in claim 1 wherein said sensor means includes a meter reading means.

14. The system as set forth in claim 13 wherein said meter reading means comprises a. a bridge circuit having a balanced and unbalanced state;

b. probe means connected in one leg of said bridge circuit and positioned to detect the passage of a pointer on a meter past a predetermined point, whereby said bridge changes states when said pointer passes said predetermined point; and c. output means for producing an output when said bridge circuit becomes unbalanced.

15. The system as set forth in claim 14 wherein said bridge circuit is a capacitive bridge circuit and wherein said probe means is a capacitive probe.

16. The system as set forth in claim 14 wherein said output means comprises a. differential amplifier means connected across said bridge circuit;

b. Schmitt trigger means connected to said differential amplifier means for changing states when said differential amplifier produces an output; and c. encoder means for producing an output when said Schmitt trigger means changes states wherein the output of said encoder means is said data signals.

* * * * *